(12) United States Patent
Ballantine (10) Patent No.: US 7,308,982 B2
(45) Date of Patent: Dec. 18, 2007

(54) DISC SLEEVE WITH RETENTION FEATURE

(75) Inventor: William Scott Ballantine, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 666 days.

(21) Appl. No.: 10/814,196

(22) Filed: Apr. 1, 2004

(65) Prior Publication Data

US 2005/0218019 A1    Oct. 6, 2005

(51) Int. Cl.
*B65D 85/57* (2006.01)

(52) U.S. Cl. .................................. 206/312; 206/308.1

(58) Field of Classification Search ............ 206/308.1, 206/309, 311, 312, 232; 229/72, 300
See application file for complete search history.

(56) References Cited

U.S. PATENT DOCUMENTS

| | | | |
|---|---|---|---|
| 4,263,357 A * | 4/1981 | Holson ........................ 428/138 |
| 5,396,987 A * | 3/1995 | Temple et al. ............... 206/309 |
| 5,662,217 A | 9/1997 | Durr | |
| 6,286,672 B2 | 9/2001 | Dos Santos | |
| 6,446,800 B2 * | 9/2002 | Bergh et al. ............. 206/308.1 |
| 6,681,929 B2 | 1/2004 | Bergh et al. | |
| 6,698,587 B2 | 3/2004 | Bergh et al. | |
| 6,745,896 B2 * | 6/2004 | Palmer ........................ 206/312 |
| 6,796,426 B2 * | 9/2004 | Fu et al. .................... 206/308.1 |

OTHER PUBLICATIONS

Picture of Flat, No Flap Sleeve, unknown manufacturer, 1 photosheet, date unknown but prior to the filing of the present application.

* cited by examiner

*Primary Examiner*—David T. Fidei
(74) *Attorney, Agent, or Firm*—Banner & Witcoff, Ltd.

(57) ABSTRACT

A disc sleeve is provided for allowing safe storage of discs and/or information articles. The sleeve may include a disc access opening formed on a wall of the sleeve and an information article access opening along an edge of the sleeve. The sleeve also may include a disc retention joint to allow for secure storage of a disc when the sleeve is turned upside down, shaken, or handled during manufacturing. The sleeve may be designed to include a use verification joint to verify whether the disc has been removed from the sleeve.

24 Claims, 7 Drawing Sheets

DISC SLEEVE WITH RETENTION FEATURE

FIELD OF THE INVENTION

The invention relates generally to storage units for housing digital media, such as compact discs. More specifically, the invention relates to a storage device for secure retention of a disc.

BACKGROUND OF THE INVENTION

The advancement of the computer industry has impacted both industry and society immensely. Today, the computer industry is a multi-billion dollar business machine, with advancements in speed, technology, size, and cost everyday. One area of advancement is in storage units and capacity for media and multimedia information.

The early years in the computer industry found magnetic tapes as a means for storing information. Advancements in technology lead to the 5¼-inch floppy disc, which soon lead to the 3½-inch floppies. Eventually, optical technology led to the compact disc and digital video disc, or digital versatile disc. Information of various types, whether audio, video, data, or multimedia, can be stored in these various storage devices.

Today, two of the primary means of information storage are the compact disc (CD) and the digital video disc (DVD). These two forms of information storage have become a staple in both the computer and music/entertainment industries. The reasons are clear. The data storage capacity of a CD and DVD is much larger than compared to other technologies. Today, much of the software that is sold is only available on CD, DVD, or other similar media forms. Alternative media forms such as the floppy disk, videocassette recorder tapes and audiocassettes are being phased out by many manufactures or listed as an additional feature to the standard model.

Figure 1A:
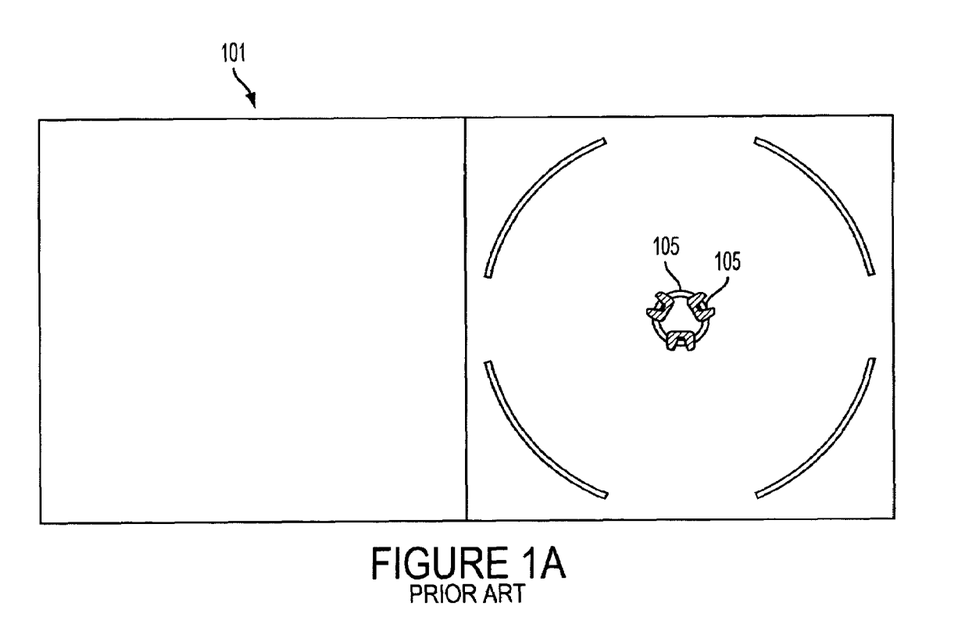
FIG. 1A illustrates a conventional jewel case style disc holder.
Figure 1B:
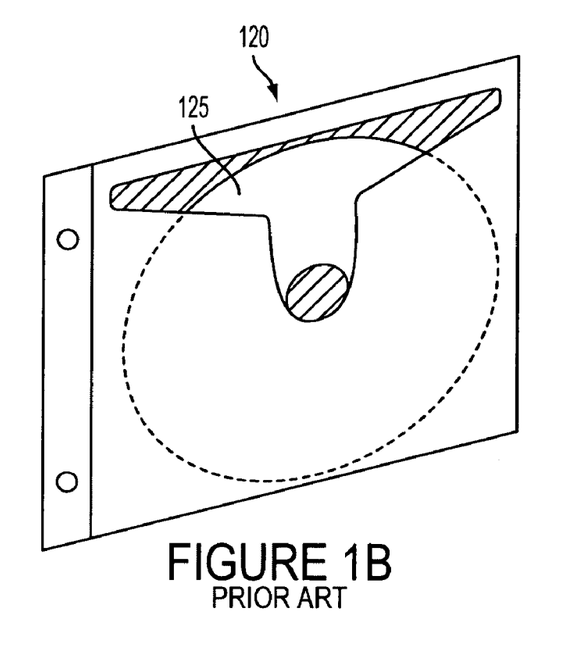
FIG. 1B illustrates a conventional disc sleeve with a pocket on the front side and a disc within the pocket.
Figure 1C:
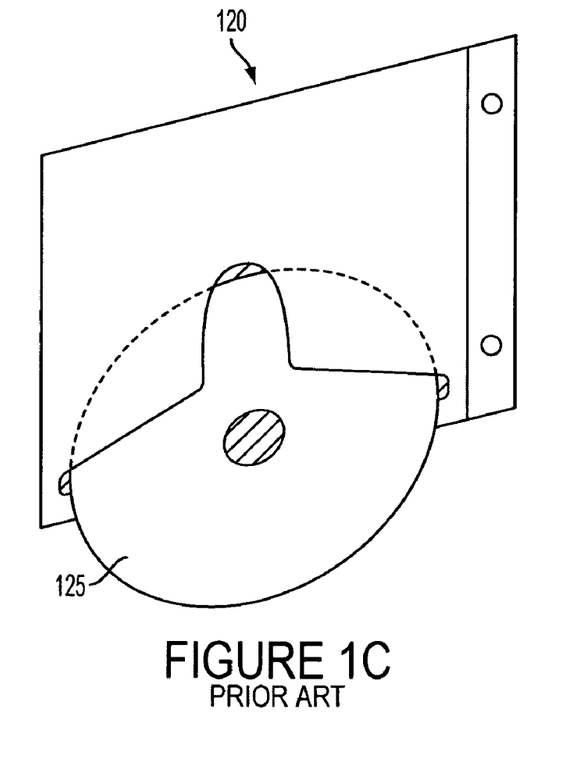
FIG. 1C illustrates the conventional disc sleeve of FIG. 1B in an inverted position and the disc sliding out of the sleeve.

The actual operating surface of CDs, DVDs and other similar forms of information storage is susceptible to damage from contact with oil from a fingerprint, dust particles, and scratches to its surface to name a few. One type of protective device is the jewel case design that opens like a book. FIG. 1A is an example of an existing jewel case design 101. The edge of the center hole of a CD or DVD is secured to the jewel case by plastic molded clamp arms 105. However, these protective devices are bulky and rigid. Another type of protective device is the conventional polypropylene and paper sleeve. FIG. 1B is an example of a polypropylene sleeve 120. Conventional polypropylene and paper sleeves are flexible materials. However, in many such designs, a disc 125 inserted into the sleeve 120 can slip within and/or fall out of the sleeve 120 itself, as illustrated in FIG. 1C, such as when the sleeve 120 is inverted.

Figure 1D:
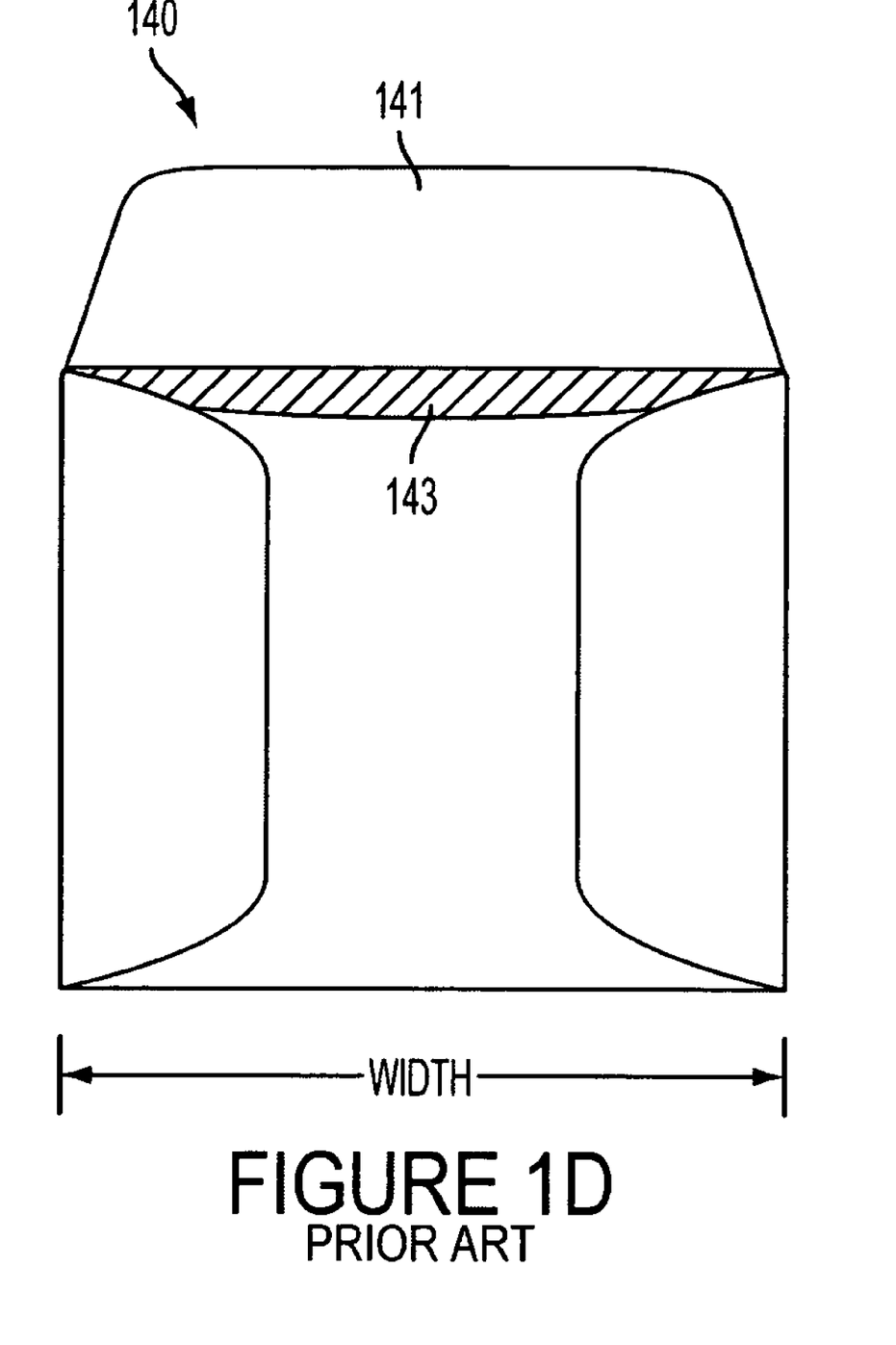
FIG. 1D illustrates a conventional disc sleeve with a large flap extending substantially along an entire edge.

Still further, some disc sleeves have security features to protect from loss of or damage to a disc. One feature to prevent loss of a disc has been to make the pocket access opening at the top of the sleeve. However, with a large enough jolt and/or prolonged insertion and removal, a disc can possibly fall out of such a sleeve. As shown in FIG. 1D, another feature has been the use of a large flap 141 that spans substantially the entire width of the disc sleeve 140 and over the entire access opening 143. This large flap 141 must be tucked into the interior compartment of the disc sleeve 140. The large flap 141 is intended to help secure the disc in the sleeve and protect against the disc sliding back toward the access opening 143. However, such a large flap 141 has disadvantages in that the flap can become dislodged from its tucked position causing a disc within the sleeve to move within the sleeve, potentially scratching it, and/or to fall out of the sleeve completely. A further disadvantage is that, during insertion, the large flap must to be folded over once a disc has been inserted into the sleeve.

Figure 1E:
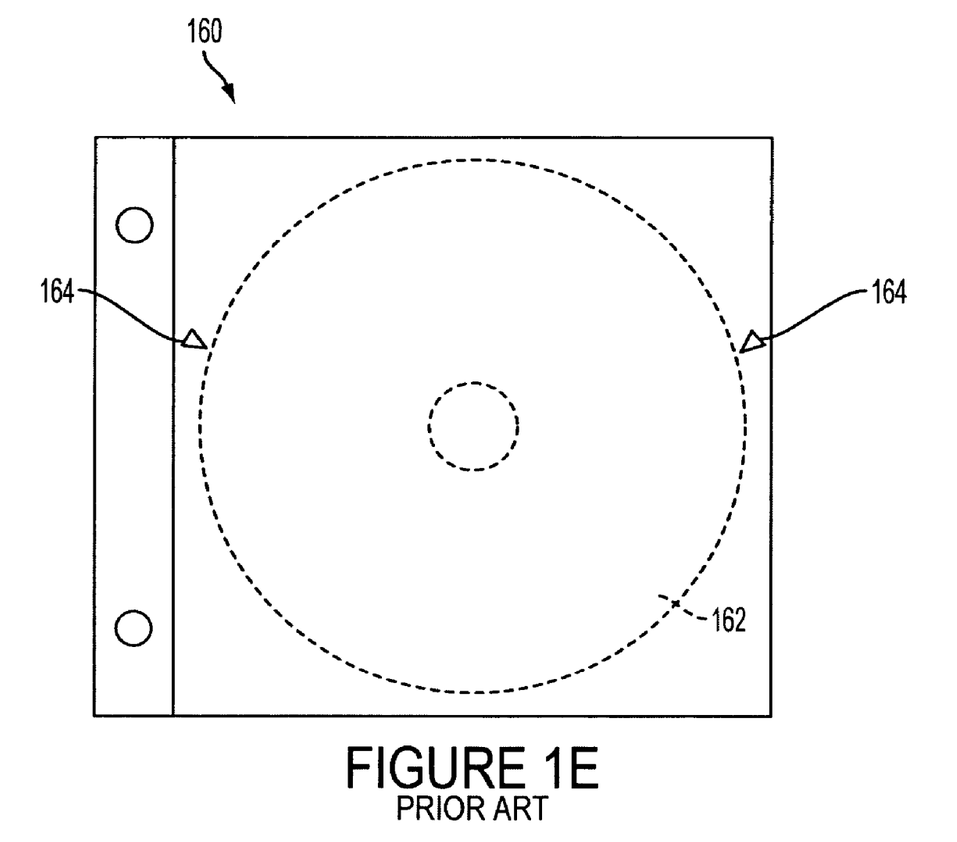
FIG. 1E illustrates a conventional disc sleeve with two retention nubs.

Another type of existing disc sleeve includes retention features to secure a disc within the sleeve. FIG. 1E illustrates a disc sleeve 160 that includes two retention nubs 164. Retention nubs 164 are locations where different layers of the sleeve 160 are welded together. The weld is through all layers of the sleeve 160, whether a two-layer sleeve or a three-layer sleeve. Retention nubs 164 are designed to prevent slippage of a disc 162 within the disc sleeve 160. In addition, the two retention nubs 164 prevent the disc 162 from sliding out of the disc sleeve 160 completely when the sleeve 160 is turned upside down, shaken, or handled in the manufacturing process. However, because conventional retention nubs 164 are so small in size, the retention nubs 164 tend to easily tear away. As such, when a disc 162 is inserted and removed a number of times, the welds tear away and the disc is free to slide within the sleeve and/or fall out of the sleeve completely. Further, in a three-layer sleeve, the back side of the sleeve (opposite the side with the disc) is welded, preventing the insertion of an information article the entire area of the back compartment. If a user attempted to place an information article into a back compartment area of the sleeve, the information article would hit the retention nubs while being loaded, thereby preventing the information article from being inserted correctly. In the manufacturing process, the information article may be damaged and/or the retention nubs may be damaged.

BRIEF SUMMARY OF THE INVENTION

To overcome limitations in the prior art described above, and to overcome other limitations that will be apparent upon reading and understanding the present specification, the present invention is directed to a cost-effective disc sleeve solution that will help alleviate many of the problems associated with disc insertion machines and protection of discs from damage.

A first aspect of the invention provides a first storage compartment defined in part by a front wall, a second storage compartment, having lateral boundaries, defined by a back wall, a divider located between the front and back walls, a disc access opening providing access for the entry of a disc into the first storage compartment, an access opening into the second storage compartment, and a disc retention joint configured to assist in retention of the disc located within the first storage compartment. At least a portion of the disc retention joint is laterally spaced from the second storage compartment. The disc retention joint may be a welded point of the front wall and divider or a welded point of the front wall, back wall, and divider.

Another aspect of the invention provides a storage compartment defined in part by a first wall, a disc, a disc access opening providing access for the removal of the disc from the storage compartment, and a use verification joint defined in part by a weld point of the first wall to a second wall. The use verification joint is configured to tear, rip, and/or separate upon removal of the disc from the storage compartment. The use verification joint may be positioned between the disc and the disc access opening. Still another aspect of the invention provides a method for manufacturing a flat disc storage sleeve.

In yet another aspect of the invention, a disc sleeve is provided that facilitates automated disc insertion by a multitude of disc loading manufacturers. This aspect includes a flexible disc retention joint positioned along one side of the disc sleeve to allow for easy one-step removal/insertion of a disc while still protecting the disc from falling out of the disc sleeve.

Other features and advantages of the present invention will become readily apparent in view of the following detailed description and accompanying drawings.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

It should be noted by those skilled in the art that the term "disk" has come to define an information storage medium utilizing magnetic technology. Further, the term "disc" has come to define an information storage medium utilizing optical technology. For the purposes of disclosing this invention, the term "disc" will be used to generally comprise the known technologies of magnetic storage, optical storage, a combination of the two, and any other similar flat information storage medium.

Figure 2A:
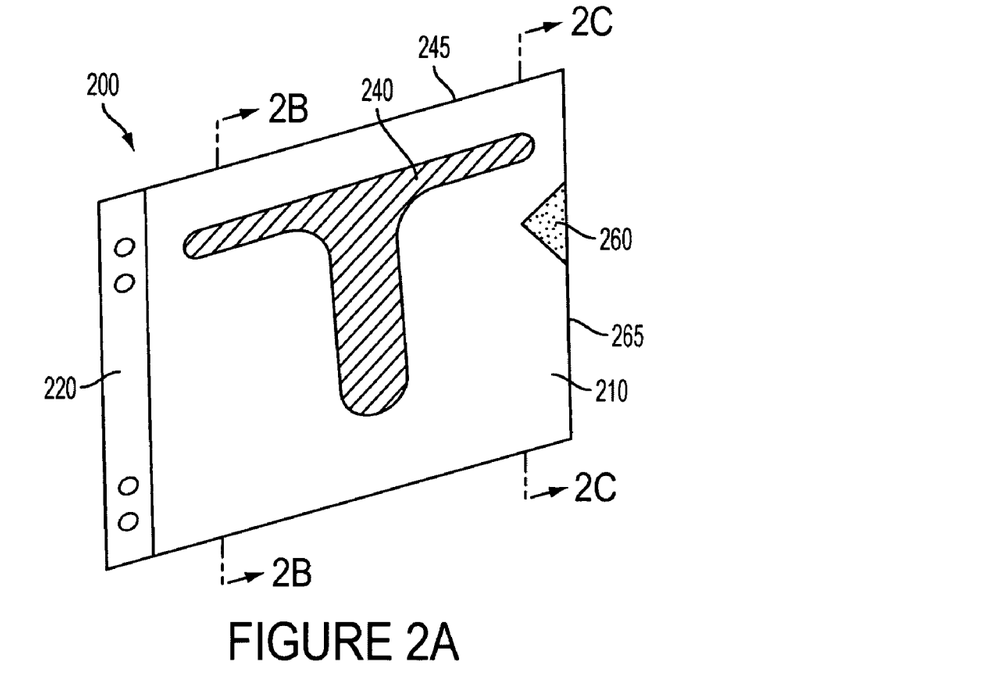
FIG. 2A illustrates a perspective view of a disc sleeve with a disc access opening immediately adjacent to a horizontal edge and a disc retention joint along a vertical edge according to one or more aspects of the invention.

With reference to FIG. 2A, an improved sleeve for securely storing discs is shown. For purposes of describing the present invention, FIG. 2A will represent what will be defined as the front of the disc sleeve. Terms oriented toward a back, bottom, or such will be referenced in relation to the front on the disc sleeve as shown in FIG. 2A. FIG. 2A shows the front of a disc sleeve 200 with an interface connector 220 affixed along a side of the body 210 of the disc sleeve 200. The disc sleeve 200 can be substantially rectangular in shape and the disc sleeve body 210 and walls of the disc sleeve 200 may be substantially rectangular in shape. It should be understood by one skilled in the art that the present invention is not so limited to a substantially rectangular shaped sleeve. Further, shown is a disc access opening 240 providing access into an interior compartment on the front of the disc sleeve immediately adjacent to a horizontal edge 245 at the top of the disc sleeve 200. A disc retention joint 260 providing security in minimizing the slippage of a disc is located along a vertical edge 265 at the side of the disc sleeve on an opposite side of the disc sleeve body 210 from the interface connector 220. Disc retention joint 260 reduces the passageway width of the front interior pocket in a selected location to hold the disc in place. Although not shown in FIG. 2A, disc retention joint 260 may be located along a vertical edge at the side of the disc sleeve that the interface connector 220 is located.

Referring back to FIG. 2A, the disc retention joint 260 along a vertical edge 265 at the side of the disc sleeve 200 is along a different edge than the disc access opening 240, and in this embodiment is located on an edge 90° displaced from the disc access opening 240. Interface connector 220 may be a multiple interface connector permitting interface to a variety of secondary storage devices. In addition, disc access opening 240 is positioned to facilitate automated disc insertion into an interior compartment while still protecting a disc from damage. Further, for purposes of this invention, the term "at" will be used to generally comprise "immediately adjacent to" and "along." Therefore, as described herein, a disc retention joint 260 is "along" a vertical edge 265 could be "immediately adjacent to" a vertical edge 265.

Figure 2B:
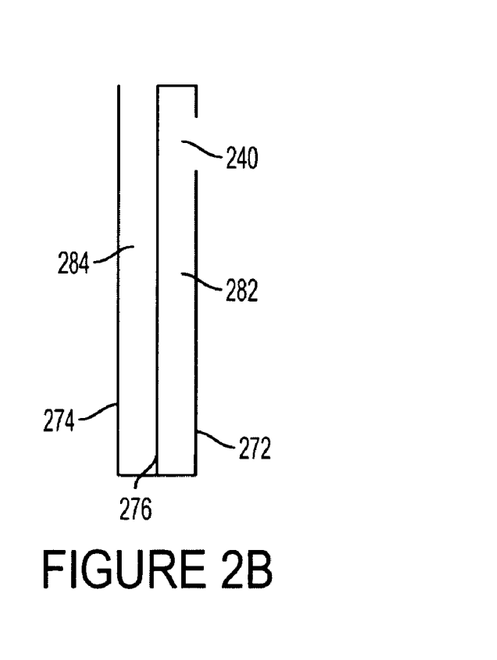
FIG. 2B illustrates a schematic cross section of the disc sleeve in FIG. 2A taken through line 2B.
Figure 2C:
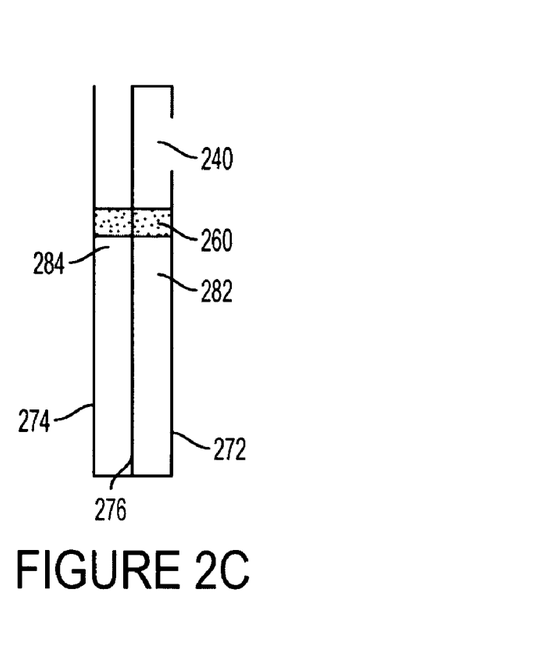
FIG. 2C illustrates a schematic cross section of the disc sleeve in FIG. 2A taken through line 2C.

In FIG. 2B, a cross section view of FIG. 2A is shown. The disc sleeve 200 comprises a front wall 272 and back wall 274, as well as a divider 276. The front wall 272 and divider 276 are affixed to form a front compartment 282. The back wall 274 and the divider 276 are affixed to form a back compartment 284. Further, as illustrated in FIG. 2B, the disc access opening 240 is shown immediately adjacent to the top of the disc sleeve 200. In FIG. 2C, a different cross section view of FIG. 2A is shown. As shown in FIG. 2C, disc retention joint 260 may be a point where all three layers (front wall 272, divider 276, and back wall 274) of disc sleeve 200 have been welded together. Alternatively, although not shown, disc retention joint 260 may be a point where only the front wall 272 and divider 276 have been welded together.

Figure 3:
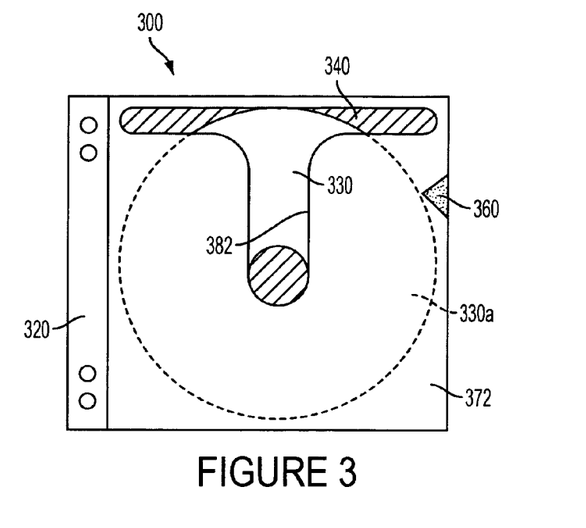
FIG. 3 illustrates a front view of a disc sleeve, shown with a CD or DVD contained therein in phantom line form and a disc retention joint according to one or more aspects of the invention.
Figure 4A:
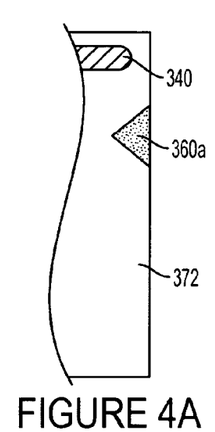
FIGS. 4A-4D illustrate alternative shape configurations of the disc retention joint according to one or more aspects of the invention.
Figure 4B:
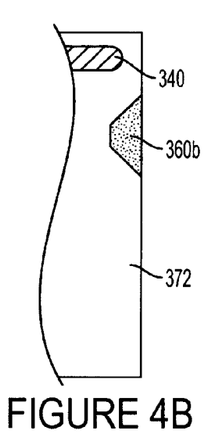
Figure 4C:
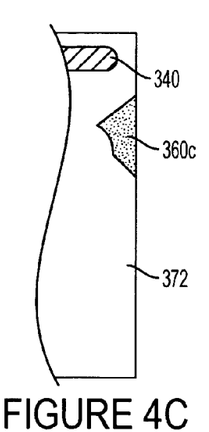
Figure 4D:
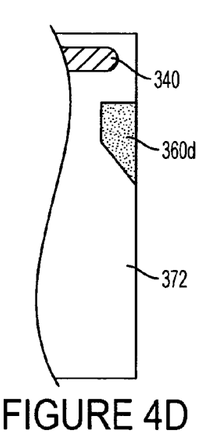

FIG. 3 illustrates a disc sleeve 300 in which a disc, CD/DVD or other similar optical storage medium, 330 rests inside of an interior compartment/pocket 310 of the disc sleeve 300. Portions of the disc 330 are shown by reference element 330a in phantom line form to represent the portions of the disc resting underneath the front wall 372. Connector 320 is shown. Connector 320 may be a separate element from the front wall 372, back wall 374 and/or divider 376 and/or affixed to each of the front wall 372, back wall 374, and/or divider 376. Alternatively, connector 320 could be an integral extension of the front wall 372 and/or back wall 374. The disc 330 can be removed and reinserted into the front interior compartment 382 through the disc access opening 340 at the top of the disc sleeve 300. The disc retention joint 360 is positioned to maintain security in the fact that the disc 330 will not accidentally or inadvertently fall out of the front interior compartment 382 of the disc sleeve 300. The disc retention joint 360 is configured to allow for easy insertion and removal of a disc 330, while rigid enough to withstand the weight of the disc 330 pushing against the disc retention joint 360 when the disc sleeve 300 is typically being moved or transported. Disc retention joint 360 may be an angled point on a vertical edge of the disc sleeve 300. Disc retention joint 360 is configured to hold the disc 330 in the sleeve 300 when the sleeve 300 is turned upside down, shaken, or handled during the manufacturing process. Ensuring that a disc stays in the sleeve 300 during product movement helps to minimize the risk of damage to the disc 330 and data stored on the disc 330 (e.g., scratching the disc, chipping the disc, or breaking the disc). Further, the use of a single disc retention joint may allow for easier insertion and removal of a disc from the disc sleeve when done by hand.

The configuration of the disc retention joint 360 along the vertical edge of the disc sleeve 300 allows a disc 330 to be loaded into the disc sleeve 300 using automation equipment by preventing problems associated with loaders inserting the disc into the sleeve. Other types of disc retention features, such as multiple disc retention nubs, only allow for hand insertion of a disc into a sleeve. As shown in FIG. 3, once a disc 330 has been inserted into the disc sleeve 300, the disc retention joint 360 holds the disc in the front interior compartment 382 until the customer removes the disc 330 for use. Disc retention joint 360 is designed to be durable and reusable, thereby continuing to hold the disc 330 in place even after inserting and removing the disc 330 several times.

FIGS. 4A-4D illustrate alternative configurations of the disc retention joint 360 as shown in FIG. 3. FIGS. 4A-4D illustrate alternative disc retention joint 360a-360d in the form of a triangular shaped joint 360a, a trapezoidal shaped joint 360b, a concave edge shaped joint 360c, and a second trapezoidal shaped joint 360d. Other shapes and/or sizes for the disc retention joint 360 could also be used, depending on the aesthetic appearance a user or manufacturer may intend.

Figure 5:
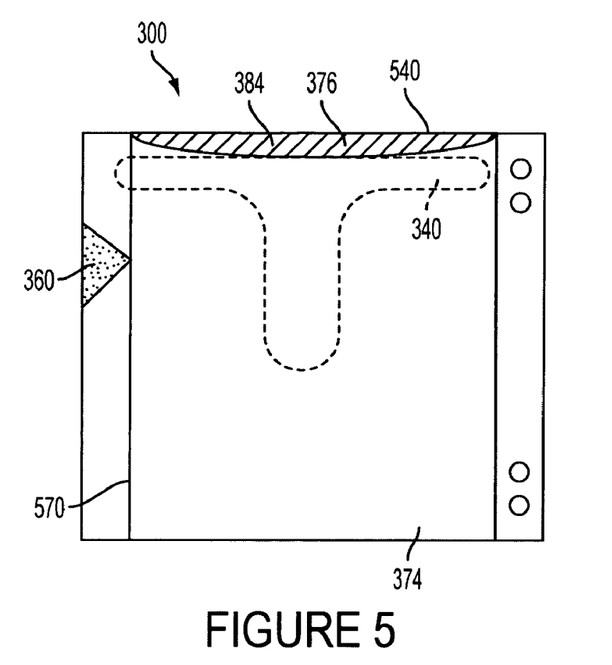
FIG. 5 illustrates a rear view of the disc sleeve of FIG. 3, shown with an information article access opening along a vertical edge and the disc retention joint along a horizontal edge of the disc sleeve according to one or more aspects of the invention.

The back of the disc sleeve 300 is shown in FIG. 5. FIG. 5 illustrates an information article access opening 540 at a horizontal edge of the disc sleeve 300 and the disc access opening 340, shown in phantom line form, immediately adjacent to a horizontal edge on the front of the disc sleeve 300. A divider 376 may separate the two sides, front wall 372 and back wall 374, of the disc sleeve 300. Preferably, the disc sleeve 300 comprises the two separate walls, front wall 372 and back wall 374, and divider 376. The information article access opening 540 permits a machine or user to load an information article, such as a song pamphlet for a CD, into a back interior compartment 384 of the disc sleeve 300. License agreements for software, chapter index information for movies, and user specified information are just some others types of information that can be inserted into a back interior compartment 384 through the information article access opening 540.

It should be understood by those skilled in the art that disc sleeve 300 may include only one interior compartment. Aspects of the present invention are not so limited to a three layer disc sleeve and/or a disc sleeve that includes multiple interior compartments. Further, it should be understood by those skilled in the art that the back interior compartment 384 may be configured to maintain a second disc within the disc sleeve. Information article access opening 540 may be a second disc access opening, such as disc access opening 340. Still further, the location of the information article access opening 540 and/or second disc access opening may be along a different edge than shown in FIGS. 3 and 5. For example, disc access opening 340 may be along a top edge as shown in FIG. 3, while information article access opening 540 may be along a vertical edge that is located on an edge 90° displaced from the disc access opening 340. It should also be understood by those skilled in the art that disc retention joint 360 may be configured to maintain two discs within the same sleeve when the two interior compartments, 382 and 384, are used to hold one disc 330 each.

Disc retention joint 360 is also shown in FIG. 5. As described above, disc retention joint 360 may not be a welded point through all three layers, front wall 372, divider 376, and back wall 374, but could also be a welded point only through front wall 372 and divider 376. As shown in FIG. 5, a seam 570 runs vertically adjacent to the disc retention joint 360. Seam 570 is a welded line that welds back wall 374 to divider 376. Seam 570 does not weld front wall 372 to divider 376 and/or back wall 374. As such, when viewed from the back of disc sleeve 300, back interior compartment 384 has a straight edge along three sides and an opening at the top edge of the disc sleeve 300. The use of a single disc retention joint 360 as shown in FIG. 3 and FIG. 5 provides an efficient manufacturing process. During manufacturing of disc sleeve 300, equipment need only weld a single disc retention joint 360 during the process compared to disc sleeves that utilize two or more disc retention nubs. A single weld process lowers the amount of time and resources spent in producing multiple welds. In addition, in manufacturing disc retention nubs, equipment must be tooled to receive layers of a sleeve and then weld the two nubs at pre-defined distances from each other and in relation to the outline of the layers. Alternatively, using a single disc retention joint 360, allows tooling equipment to perform one weld, thereby allowing a variety of different shaped layer outlines to be manufactured on the same machine. Disc sleeves of various lengths can have a disc retention joint 360 welded in place along an edge. Under conventional double retention nubs, predefined distances are a necessity and the outline of the layers are thus effected.

Still further, welded seam 570 creates a smooth uninterrupted article engageable side to the back interior compartment 384 so that an information article can be inserted into the back interior compartment 384 without damaging the information article and/or the disc retention joint 360. Without seam 570, if an information article where to be inserted into the back interior compartment 384, the information article would bump into disc retention joint 360. As such, disc retention joint 360 may tear and/or the information article may be damaged. Because disc retention joint 360 is located along a side of the seam 570 and opposite the side forming one side of the back interior compartment 384, a machine that automatically loads an information article into the back interior compartment 384 would not tear and/or separate disc retention joint 360 and/or damage the information article in the process.

It should be understood by those skilled in the art that the location of interface 320 and the disc access openings 340 and 540 may be different than the examples shown in FIGS. 3 and 5. The present invention may further include a disc sleeve including two disc access openings. One disc access opening would allow insertion/removal of a disc into/from one side of a sleeve and a second disc access opening would allow insertion/removal of a second disc into/from the other side of the sleeve. Because many manufacturers allow for duplication of a disc for personal back-up use, a manufacturer can send two copies at one time within the same sleeve. Multiple configurations of disc access openings and/or information article access openings may be included in accordance with aspects of the present invention.

Figure 6:
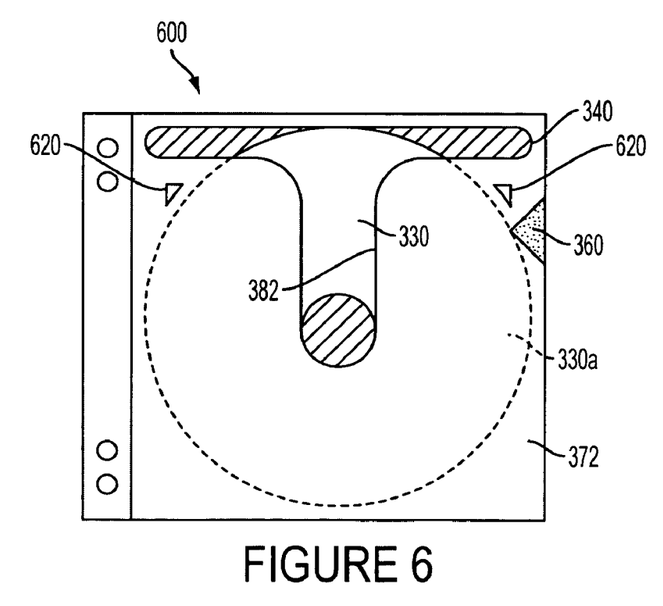
FIG. 6 illustrates a front view of a disc sleeve, shown with a CD or DVD contained therein in phantom line form, the disc retention sleeve, and use verification joints according to one or more aspects of the invention.

FIG. 6 illustrates a disc sleeve 600 in which a disc, CD/DVD or other similar optical storage medium, 330 rests inside of an interior compartment/pocket 382 of the disc sleeve 600. Portions of the disc 330 are shown by reference element 330a in phantom line form to represent the portions of the disc resting underneath the front wall 372. During the manufacturing process, the disc 330 may be inserted into the front interior compartment 382 through the disc access opening 340 at the top of the disc sleeve 600. The disc retention joint 360 is positioned to maintain security in the fact that the disc 330 will not accidentally or inadvertently fall out of the front interior compartment 382 of the disc sleeve 600.

The configuration of the single disc retention joint 360 along the vertical edge of the disc sleeve 600 allows a disc 330 to be loaded into the disc sleeve 600 using automation equipment by prevents problems associated with loaders inserting the disc into the sleeve 600. As shown in FIG. 6, once a disc 330 has been inserted into the disc sleeve 600, the disc retention joint 360 holds the disc 330 in the front interior compartment 382 until the customer removes the disc 330 for use. Disc sleeve 600 also shows use verification joints 620. Use verification joints 620 are used to verify that a user has not yet removed the disc 330 from the sleeve 600. A use verification joint 620 prevents an initial removal of a disc 330 from the sleeve 600 without providing indication of such initial removal. For example, use verification joints 620 may separate a weld point between the front wall 372 and divider 376. Use verification joints 620 are not designed to prevent removal of discs 330 from the sleeve 600 and are designed to separate and/or tear away by a minor force applied when removing the disc 330. Use verification joints 620 are designed to maintain a welded point when disc 330 presses against it during transportation and handling, but is also designed to easily separate when a user desired to remove the disc 330 from the sleeve 600.

Use verification joints 620 may be configured to act as part of a warranty and/or license. Similar to the disc retention joint 360, use verification joints 620 are points where the front wall 372 has been welded together with a divider, such as divider 376. Alternatively, use verification joints 620 may be points where all three layers, the front wall 372, divider 376, and back wall 374, have been welded together. Use verification joints 620 are placed on sleeve 600 once disc 330 has been inserted. As such, when a user removes the disc 330 from the sleeve 600, she will tear and/or separate the connection of the use verification joints 620 between the front wall 372 and divider 376, thereby indicating that the user has removed the disc 330 from the sleeve 600. As a method for deterring copies being made and then returned, use verification joints 620 may be used to indicate that the disc 330 has at least been removed from the sleeve 600. Therefore, if a user has purchased the disc 330 and the use verification joints 620 are torn and/or separated, the user may receive a replacement disc if defective, but she may not receive her original money back if such are the terms of the purchase.

Once the use verification joints 620 have been torn, a user can still maintain a disc 330 in the sleeve 600 and may still utilize the disc retention joint 360 for securing the disc 330 when maintained within the sleeve 600. When the use verification joints 620 have been torn and/or separated, disc sleeve 600 may operate in the exact same manner as disc sleeve 300 shown in FIG. 3. Use verification joints 620 may be located in different positions than the ones shown in FIG. 6. Use verification joint 620 may be any point where the front wall 372 and divider 376 must be torn and/or separated from a welded point in order to remove the disc 330 from the sleeve 600.

During manufacturing, seam 570 may be formed by welding divider 376 and back wall 374. Front wall 372 may then be welded to the attached divider 376 and back wall 374 along three peripheral edges. A front interior compartment 382 and a back interior compartment 384 are formed. Front wall 372, back wall 374, and back wall 374 may be welded so that two of the three peripheral edges are parallel to seam 570. Disc retention joint 360 may be welded along a welded peripheral edge so that disc retention joint 360 is located along a side of seam 570 opposite the side forming one side of the back interior compartment 384. In addition, a disc 330 may be inserted into the front interior compartment 382 during the manufacturing process and at least one use verification joint 620 may be welded between the disc and the opening to the front interior compartment 382. Because the use verification joints 620 are designed to prevent an initial removal of the disc 330 from the sleeve 600 without providing indication of such an initial removal, disc 330 is inserted into the sleeve 600 prior to the step of welding the use verification joint 620.

The weld examples cited herein may be formed by ultrasonic welding, radio frequency welding or other forms of connection between the various layers identified. The present invention is not limited to any one welding process and/or result. Further, although described herein with reference to two layers or three layers, a disc sleeve, in accordance with at least one aspect of the present invention, may include one layer that has been folded over itself and sealed in some manner. Further, a disc sleeve, in accordance with at least one aspect of the present invention, may be a multi-folded material that has been sealed to form an interior or multiple interior compartments. The present invention is not so limited to the manner of formation of the interior compartments of the disc sleeve.

The invention may be embodied in a number of combinations from those described above. For example, the disc access opening may be immediately adjacent to a vertical edge while the disc retention joint is at a horizontal edge at the top of the disc sleeve. The walls, divider, and connector can comprise a plurality of materials. The front and back walls, the divider, and the connector of the disc sleeve may comprise polypropylene. Further, the connector may comprise a micron satin spine strip, which is ultrasonically welded to the disc sleeve. Again, the disc sleeve can comprise many different types of materials.

Although not shown in the accompanying drawings, each edge of the disc sleeve, as well as the disc retention joint and use verification joints, may be welded together or affixed by adhesive or similar technique. Technique to affix portions of the disc sleeve together could include a combination of welding and adhesive. Generally, the front wall and divider and the back wall and divider form the front and back interior compartments respectively. Preferably, the edges of the front wall and divider are affixed around the entire peripheral edges. To accommodate an information article access opening, the edges of the back wall and the divider are affixed around the entire peripheral edge, except a portion along one side of the disc sleeve. Further, the walls of the disc sleeve or the divider and a wall could be formed from one piece of material that is folded to create an edge for one side of the disc sleeve. The invention is not so limited to three separate independent pieces to comprise the front and back walls and the divider.

While the invention has been described with respect to specific examples including presently preferred modes of the invention, those skilled in the art will appreciate that there are numerous variations and permutations of the above described invention. Thus, the spirit and scope of the invention should be construed broadly as set forth in the appended claims.

I claim:

1. A flat disc storage sleeve comprising:
   a first storage compartment defined in part by a front wall;
   a second storage compartment, having lateral boundaries, defined in part by a back wall;
   a divider located between the front and back walls to form the first and second storage compartments;
   a disc access opening providing access for the entry of a disc into the first storage compartment;
   a disc retention joint configured to assist in the retention of the disc located within the first storage compartment; and
   an access opening into the second storage compartment,
   wherein at least a portion of the disc retention joint is laterally spaced from the second storage compartment,
   wherein the disc retention joint is positioned along a vertical edge of the flat disc storage sleeve,
   wherein the disc retention joint is located at a point where the front wall and divider are welded together.

2. A flat disc storage sleeve comprising:
   a first storage compartment defined in part by a front wall;
   a second storage compartment, having lateral boundaries, defined in part by a back wall;
   a divider located between the front and back walls to form the first and second storage compartments;
   a disc access opening providing access for the entry of a disc into the first storage compartment;
   a disc retention joint configured to assist in the retention of the disc located within the first storage compartment; and
   an access opening into the second storage compartment,
   wherein at least a portion of the disc retention joint is laterally spaced from the second storage compartment,
   wherein the disc retention joint is positioned along a vertical edge of the flat disc storage sleeve,
   wherein the disc retention joint is located at a point where the front wall, back wall, and divider are welded together.

3. The flat disc storage sleeve of claim 2, further comprising a connector.

4. The flat disc storage sleeve of claim 3, wherein the connector is a separate element from the front or back walls or the divider and is affixed to each of the front and back walls and divider.

5. The flat disc storage sleeve of claim 3, wherein the connector is an integral extension of the front and back walls.

6. The flat disc storage sleeve of claim 2, wherein the disc retention joint is one of: a triangular shaped joint, a trapezoidal shaped joint, and a curved edge shaped joint.

7. The flat disc storage sleeve of claim 2, wherein the front and back walls and the dividers are substantially rectangular in shape.

8. The flat disc storage sleeve of claim 2, further comprising at least one use verification joint.

9. The flat disc storage sleeve of claim 2, further comprising a disc and at least one use verification joint, wherein the use verification joint is positioned between the disc and the disc access opening.

10. The flat disc storage sleeve of claim 9, wherein the use verification joint is a point where the front wall and divider are welded together.

11. A flat disc storage sleeve comprising:
    a first storage compartment defined in part by a front wall;
    a second storage compartment, having lateral boundaries, defined in part by a back wall;
    a divider located between the front and back walls to form the first and second storage compartments;
    a disc access opening providing access for the entry of a disc into the first storage compartment;
    a disc retention joint configured to assist in the retention of the disc located within the first storage compartment; and
    an access opening into the second storage compartment,
    wherein at least a portion of the disc retention joint is laterally spaced from the second storage compartment,
    wherein the second storage compartment is defined in part by a welded vertical seam,
    wherein the disc retention joint is located along a side of the vertical seam opposite the side forming one side of the second storage compartment.

12. The flat disc storage sleeve of claim 11, further comprising at least one use verification joint.

13. The flat disc storage sleeve of claim 11, further comprising a disc and at least one use verification joint, wherein the use verification joint is positioned between the disc and the disc access opening.

14. A flat disc storage sleeve comprising:
    a first storage compartment defined in part by a front wall;
    a second storage compartment, having lateral boundaries, defined in part by a back wall;
    a divider located between the front and back walls to form the first and second storage compartments;
    a disc access opening providing access for the entry of a disc into the first storage compartment;
    a disc retention joint configured to assist in the retention of the disc located within the first storage compartment; and
    an access opening into the second storage compartment,
    wherein at least a portion of the disc retention joint is laterally spaced from the second storage compartment,
    wherein the disc retention joint is configured to assist in the retention of a second disc located within the second storage compartment.

15. The flat disc storage sleeve of claim 14, further comprising at least one use verification joint.

16. The flat disc storage sleeve of claim 14, further comprising a disc and at least one use verification joint, wherein the use verification joint is positioned between the disc and the disc access opening.

17. The flat disc storage sleeve of claim 1, further comprising a connector.

18. The flat disc storage sleeve of claim 17, wherein the connector is a separate element from the front or back walls or the divider and is affixed to each of the front and back walls and divider.

19. The flat disc storage sleeve of claim 17, wherein the connector is an integral extension of the front and back walls.

20. The flat disc storage sleeve of claim 1, wherein the disc retention joint is one of: a triangular shaped joint, a trapezoidal shaped joint, and a curved edge shaped joint.

21. The flat disc storage sleeve of claim 1, wherein the front and back walls and the dividers are substantially rectangular in shape.

22. The flat disc storage sleeve of claim 1, further comprising at least one use verification joint.

23. The flat disc storage sleeve of claim 1, further comprising a disc and at least one use verification joint, wherein the use verification joint is positioned between the disc and the disc access opening.

24. The flat disc storage sleeve of claim 23, wherein the use verification joint is a point where the front wall and divider are welded together.

* * * * *